(12) United States Patent
Zu et al.

(10) Patent No.: US 11,623,415 B2
(45) Date of Patent: Apr. 11, 2023

(54) RESIN BATH DEVICE FOR WET WINDING

(71) Applicant: Hefei University of Technology, Hefei (CN)

(72) Inventors: Lei Zu, Hefei (CN); Shijun Chen, Hefei (CN); Qian Zhang, Hefei (CN); Guiming Zhang, Hefei (CN); Qiaoguo Wu, Hefei (CN); Xuewen Cao, Hefei (CN); Xianglong Wang, Hefei (CN); Pengcheng Wang, Hefei (CN); Ruixiang Zhu, Hefei (CN)

(73) Assignee: Hefei University of Technology, Hefei (CN)

( * ) Notice: Subject to any disclaimer, the term of this patent is extended or adjusted under 35 U.S.C. 154(b) by 94 days.

(21) Appl. No.: 17/472,754

(22) Filed: Sep. 13, 2021

(65) Prior Publication Data

US 2022/0297392 A1    Sep. 22, 2022

(30) Foreign Application Priority Data

Mar. 22, 2021    (CN) .......................... 202110299593.6

(51) Int. Cl.
*B29C 70/32* (2006.01)
*B29C 70/86* (2006.01)
*B29L 31/00* (2006.01)

(52) U.S. Cl.
CPC .............. *B29C 70/32* (2013.01); *B29C 70/86* (2013.01); *B29L 2031/7154* (2013.01)

(58) Field of Classification Search
CPC ..................................................... B29C 70/32
See application file for complete search history.

(56) References Cited

U.S. PATENT DOCUMENTS 3,769,126 A * 10/1973 Kolek ........................ C08J 9/32
428/338

FOREIGN PATENT DOCUMENTS

EP          0810081 A1 * 12/1997
WO     WO-02/16482 A2 *  2/2002

* cited by examiner

*Primary Examiner* — Jeffry H Aftergut
(74) *Attorney, Agent, or Firm* — Jenei LLC

(57) ABSTRACT

A resin bath device for wet winding provided herein includes a resin stirring bath and a resin impregnation bath, where a bottom of a side wall of the resin stirring bath is connected to the resin impregnation bath, two ingredient baths are provided at two ends of the resin stirring bath, and a stirring mechanism is arranged inside the resin stirring bath. A resin dipping roller is mounted at a middle of the resin impregnation bath where a pressure roller is mounted at tops of side walls; an electric heating coil is arranged inside a bottom wall of the resin impregnation bath, and an electric heating rod is arranged at an axis of the pressure roller; and wire guide rollers are mounted at two ends of the side wall of the resin impregnation bath.

10 Claims, 3 Drawing Sheets

RESIN BATH DEVICE FOR WET WINDING

CROSS REFERENCE TO RELATED APPLICATION

This patent application claims the benefit and priority of Chinese Patent Application No. 202110299593.6, entitled "Resin Bath Device for Wet Winding" filed on Mar. 22, 2021, the disclosure of which is incorporated by reference herein in its entirety as part of the present application.

TECHNICAL FIELD

The present disclosure relates to the field of composite material processing, and in particular to an improved resin bath device for wet winding.

BACKGROUND ART

Composite materials have been widely used in aerospace, ships, automobiles and other fields due to their excellent properties such as high specific strength, high specific modulus, desirable resistance to both corrosion and high temperature. Wet fiber winding is low-cost technology widely applied for manufacturing composite materials. Since the resin content (that is the amount of resin carried by fiber through the process of impregnation) is one important parameter affecting the mechanical properties of composite materials and fiber impregnation mainly occurs in a resin bath, the operation of the resin bath device affects the quality of the fiber impregnation and the filament-wound products.

In the case of the current resin bath device, workers are usually required to mix epoxy resin with curing agents in proportion, stir the mixture uniformly and then add the mixture into the resin bath. This not only increases the labor intensity of operators, but also is not conducive to continuous production. Sometimes it is required to heat the mixed resin solution with a low-precision water bath. In the process that the heated resin solution leaves the resin bath to be spread through the fiber tows, the rapid loss of heat energy results in that the temperature at the impregnation position is unable to be kept within the range of technological requirements. This consequently leads to the unevenly-distributed depth of the wound fiber layers after impregnation, thereby greatly affecting the quality of the wound products. Therefore, it is necessary to develop a novel impregnation apparatus that can not only reduce the labor intensity of workers, but also accurately control the temperature during impregnation.

SUMMARY

The present disclosure aims to overcome the shortcomings in the prior art and provides an improved resin bath device for wet winding. Moreover, the present disclosure achieves the supply of a resin solution by means of mechanical stirring and continuous feeding, so as to reduce the labor intensity of workers, and ensures the stability of a temperature of the resin solution at an impregnation position by means of continuously heating the resin solution and configuring auxiliary heating inside a pressure roller, so as to improve the quality of fiber impregnation.

To achieve the above effect, the technical solution of the present disclosure is:

An improved resin bath device for wet winding includes a resin stirring bath and a resin impregnation bath which are adjacent to each other, where the resin stirring bath is connected to the resin impregnation bath at the base (in other words, as a communicating vessel); a first ingredient bath and a second ingredient bath are fixedly provided at the two ends of the resin stirring bath respectively; the first ingredient bath and the second ingredient bath are respectively connected to the interior of the resin stirring bath at their adjacent side walls respectively (again as a communicating vessel), and a stirring mechanism is provided inside the resin stirring bath and sandwiched by the first ingredient bath and the second ingredient bath.

A resin dipping roller is rotationally mounted at a middle of the resin impregnation bath; the pressure roller is rotationally mounted at tops of side walls of the resin impregnation bath and located above the resin dipping roller; an electric heating coil is arranged inside a bottom wall of the resin impregnation bath, and an electric heating rod is provided at an axis of the pressure roller.

Wire guide rollers are rotatably mounted at two ends of the side walls of the resin impregnation bath and located on two sides of the resin dipping roller, respectively.

In one embodiment, a resin outlet connected to the resin impregnation bath may be provided at a bottom of a side wall of the resin stirring bath, and a switching mechanism for the resin outlet may be provided at a top of the side wall of the resin stirring bath.

In one embodiment, the switching mechanism may include a cylinder mounting frame fixedly connected to the side wall of the resin stirring bath, a cylinder fixedly mounted at a top of the cylinder mounting frame and a switching baffle plate fixedly connected to an output shaft end of the cylinder, a side surface of the switching baffle plate may be slidably attached to an inner wall of the resin stirring bath and movably covers the resin outlet.

In one embodiment, feeding ports may be provided on bottom walls of the first ingredient bath and the second ingredient bath, proportion adjustment plates for the feeding ports are movably inserted into the side wall of the resin stirring bath, and top surfaces of the proportion adjustment plates may be slidably attached to bottom surfaces of the first ingredient bath and the second ingredient bath, respectively.

In one embodiment, an outer periphery surface of the resin dipping roller is of a saddle surface structure, and an outer periphery surface of the pressure roller is of a waist drum-shaped structure matching the outer periphery surface of the resin dipping roller.

In one embodiment, reticulated protrusions may be arranged on the outer periphery surface of the resin dipping roller.

In one embodiment, several sets of connection seats may be fixedly connected to the tops of the side walls of the resin impregnation bath; a support plate is rotatably connected to each connection seat via a locking screw; and the pressure roller and the wire guide roller each are rotationally mounted at the end of the respective support plate.

In one embodiment, a temperature sensor may be arranged at a bottom of an inner wall of the resin impregnation bath and just below the resin dipping roller.

In one embodiment, a thermal isolation layer may be arranged on the inner wall of the resin impregnation bath.

Compared with the prior art, the present embodiment has the beneficial effects as follows:

1. The present embodiment achieves continuous feeding of different materials in a fixed proportion by providing the ingredient baths at the two ends of the resin stirring bath respectively and controlling a feeding speed ratio of each ingredient bath; and realizes the supply of the resin solution by stirring the mixed resin solution by the stirring mechanism and automatically feeding the resin solution into the resin impregnation bath after it is uniformly stirred, thereby reducing the labor intensity of workers.

2. The present embodiment can continuously heat the resin solution by arranging the electric heating coil at the bottom of the resin impregnation bath, so as to supplement heat loss of the resin solution and ensure good physical properties of the resin solution; and moreover, since the electric heating rod is coaxially arranged inside the pressure roller, the temperature of the resin solution at the impregnation position is kept stable by auxiliary heating the resin solution at the impregnation position by means of the pressure roller so as to compensate heat loss of the resin solution with increasing resin solution, thereby greatly improving the quality of fiber impregnation.

Figure 1:
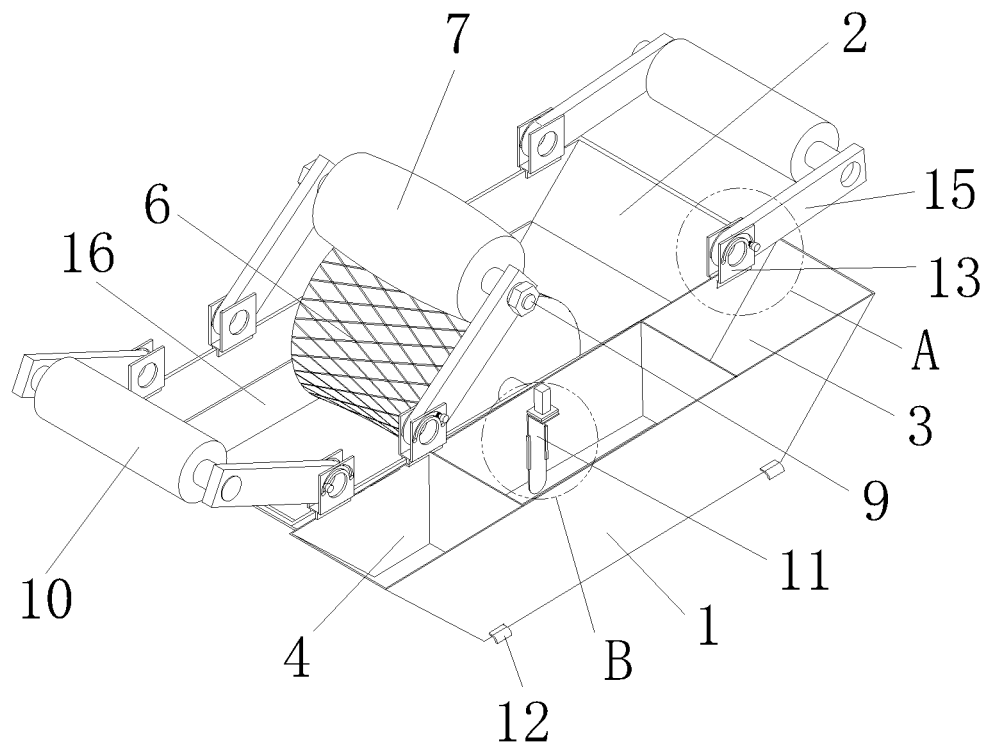
FIG. 1 is schematic perspective diagram of a structure of the present disclosure.
Figure 2:
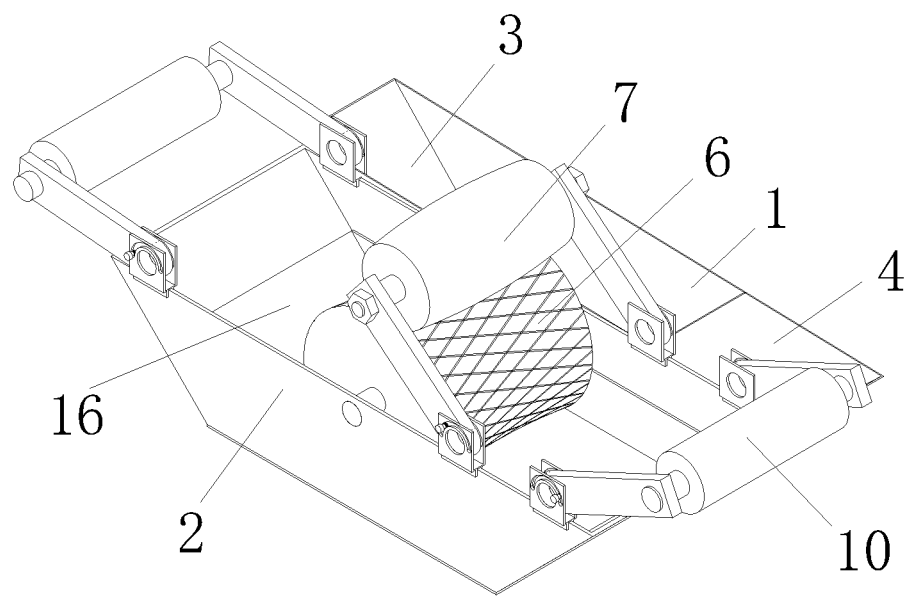
FIG. 2 is schematic perspective diagram of the structure of the present disclosure from another aspect.
Figure 3:
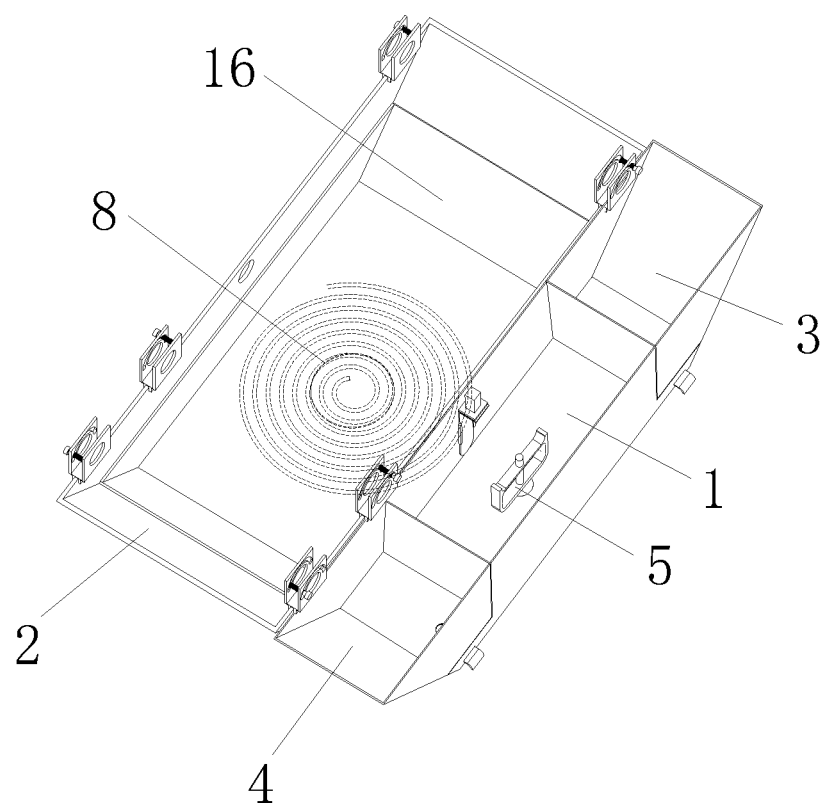
FIG. 3 is schematic perspective diagram of a resin stirring bath and a resin impregnation bath of the present disclosure.
Figure 4:
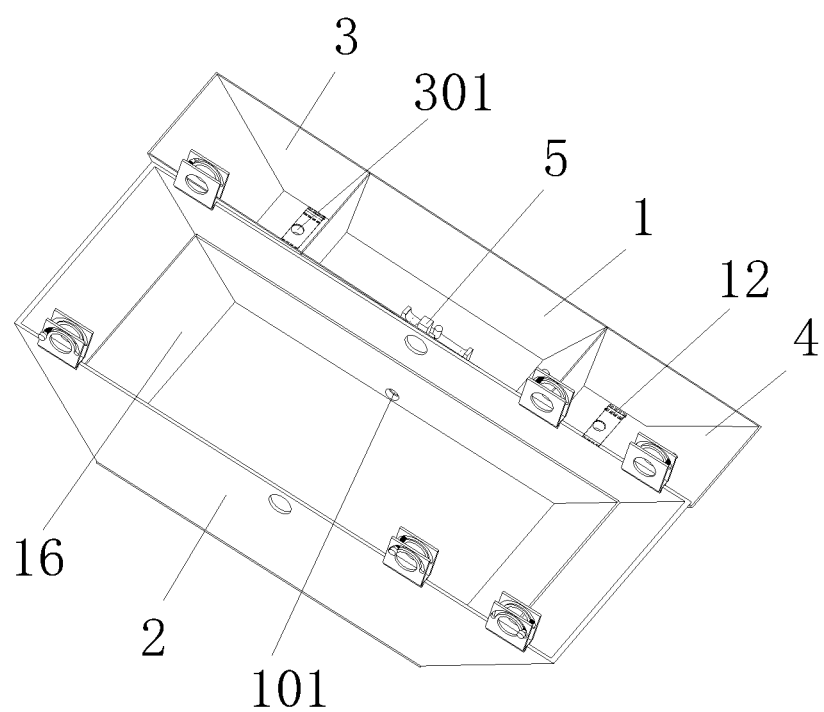
FIG. 4 is schematic perspective diagram of the resin stirring bath and the resin impregnation bath of the present disclosure from another aspect.

List of reference numerals: 1 resin stirring bath, 101 resin outlet, 2 resin impregnation bath, 3 first ingredient bath, 301 feeding port, 4 second ingredient bath, 5 stirring mechanism, 6 resin dipping roller, 7 pressure roller, 8 electric heating coil, 9 electric heating rod, 10 wire guide roller, 11 switching mechanism, 111 cylinder mounting frame, 112 cylinder, 113 switching baffle plate, 12 proportion adjustment plate, 13 connection seat, 14 lock screw, 15 support plate, and 16 thermal isolation layer.

DETAILED DESCRIPTION OF THE EMBODIMENTS

The preferred embodiment of the present disclosure is illustrated in detail below in combination with the drawings so as to enable the advantages and features of the present disclosure to be more readily understood by those skilled in the art, thereby defining the protection scope of the present disclosure clearer.

With reference to FIGS. 1 to 6, an improved resin bath device for wet winding includes a resin stirring bath 2 and a resin impregnation bath 2 which are adjacent to each other. An internal bottom surface of the resin stirring bath 1 is an inclined plane or a curved surface with a recessed middle and two gently raised ends. The resin stirring bath is configured for stirring and blending a resin solution used for fiber yarn impregnation. In this embodiment, the resin solution is formed by stirring and mixing epoxy resin and a curing agent. A first ingredient bath 3 and a second ingredient bath 4 are fixedly provided at two ends of the resin stirring bath 1 respectively. The first ingredient bath 3 and the second ingredient bath 4 are suspended at the two ends of the resin stirring bath 1. Feeding ports 301 are provided on bottom walls of the first ingredient bath 3 and the second ingredient bath 4, and a bottom of the first ingredient bath 3 and a bottom of the second ingredient bath 4 are connected to an interior of the resin stirring bath 2. When the device is actually used, the epoxy resin is poured into the first ingredient bath 3, the curing agent is poured into the second ingredient bath 4, and the epoxy resin and the curing agent flow into the resin stirring bath 1 through the respective feeding ports 301.

Preferably, proportion adjustment plates 12 for the feeding ports 301 are movably inserted into side walls of the resin stirring bath 1, and top surfaces of the proportion adjustment plates 12 are slidably attached to bottom surfaces of the first ingredient bath 3 and the second ingredient bath 4, respectively. By manually pulling or pushing the proportion adjustment plate 12, the opening or closing degree of the corresponding feeding port 301 on the first ingredient bath 3 or the second ingredient bath 4 can be changed, thereby achieving continuous feeding of two materials in a required proportion according to technological requirements.

A stirring mechanism 5 is arranged inside the resin stirring bath 2 and located between the first ingredient bath 3 and the second ingredient bath 4, and the mixed resin solution flowing into the resin stirring bath 1 is mixed and stirred by means of the stirring mechanism 5, so as to meet the technological requirements of uniform mixing in a predetermined proportion. The stirring mechanism 5 mainly includes a driving motor (not shown in the figures) fixedly mounted on a bottom surface of the resin stirring bath 1 and a frame type stirrer fixed at an output shaft end of the driving motor. The frame type stirrer is driven to rotate continuously or in an alternate reversion manner by the driving motor at a certain rotation speed, such that the resin solution in the resin stirring bath 1 may be quickly and uniformly stirred.

Figure 6:
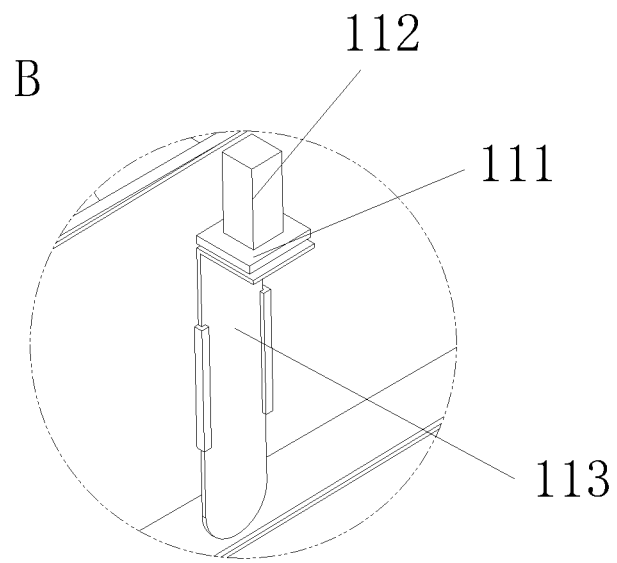
FIG. 6 is an enlarged schematic diagram of part B in FIG. 1.

The blended resin solution flows into the resin impregnation bath 2 from the resin stirring bath 1. A bottom of the side wall of the resin stirring bath 1 is connected to the resin impregnation bath 2. Specifically, a resin outlet 101 connected to the resin impregnation bath 2 is provided at the bottom of the side wall of the resin stirring bath 1, and a switching mechanism 11 for the resin outlet 101 is arranged at a top of the side wall of the resin stirring bath 1. As shown in FIG. 6, the switching mechanism 11 includes a cylinder mounting frame 111 fixedly connected to the side wall of the resin stirring bath 1, a cylinder 112 fixedly mounted at a top of the cylinder mounting frame 111, and a switching baffle plate 113 fixedly connected to an output shaft end of the cylinder 112. A side surface of the switching baffle plate 113 is slidably attached to an inner wall of the resin stirring bath 1 and movably covers the resin outlet 101.

When the device is actually used, an existing universal controller is selected to achieve logic control time sequence and time of each power assembly inside the device. During stirring, the switching baffle plate 13 tightly covers the resin outlet 101 all the time, such that the resin solution which is not completely stirred inside the resin stirring bath 1 is prevented from entering the resin impregnation bath 2. After the materials inside the resin stirring bath 1 are stirred by the stirring mechanism 5 for certain time, then the materials are in a uniformly mixed state. Subsequently, the controller activates the cylinder 112 to work to drive the switching baffle plate 113 to move upwards, such that the covered resin outlet 101 is gradually opened, and the resin solution inside the resin stirring bath 1 automatically flows into the resin impregnation bath 2.

A resin dipping roller 6 is rotatably mounted at a middle of the resin impregnation bath 2, and a pressure roller 7 is rotatably mounted at a top of a side wall of the resin impregnation bath 2 and located above the resin dipping roller 6. During impregnation, the height of the resin solution in the resin impregnation bath 2 is always located below an axis of the resin dipping roller 6, such that a lower portion of an outer periphery surface of the resin dipping roller 6 is always immersed in the resin solution, and it is ensured that the outer periphery surface of the resin dipping roller 6 may be continuously dipped in the resin solution and the resin solution adhered to the resin dipping roller 6 is conveyed to a gap (i.e., an impregnation position of a fiber) between the resin dipping roller 6 and the pressure roller 7. A fiber bundle passes through the gap, and under the collaborative action of the resin dipping roller 6 and the pressure roller 7, the resin solution coats a surface of the fiber and permeates an interior of the fiber, thereby achieving the impregnation process.

Preferably, the outer periphery surface of the resin dipping roller 6 is of a saddle surface structure, and an outer periphery surface of the pressure roller 7 is of a waist drum-shaped structure matching the outer periphery surface of the resin dipping roller 6. The use of such structures enables the fiber bundle to have excellent centrality when the fiber bundle passes through the gap between the resin dipping roller 6 and the pressure roller 7, such that the position deviation of the fiber bundle in an axial direction of the resin dipping roller 6 is avoided, and accordingly, the influence on the impregnation quality is avoided. A middle of the pressure roller 7 with the waist drum-shaped structure slightly protrudes, to cooperate with the resin dipping roller 6 for implementing the continuous impregnation process of the fiber bundle, and scrape off redundant resin solution on a surface of the fiber bundle, thereby controlling given resin amount, and further ensuring the uniformity of impregnation of the fiber bundle.

Further, reticulated protrusions are provided on the outer periphery surface of the resin dipping roller 6, to allow the outer periphery surface of the resin dipping roller 6 to reliably carry the resin solution.

In order to ensure that the resin solution inside the resin impregnation bath 2 is kept at a stable process temperature before impregnation, an electric heating coil 8 is provided at a bottom wall of the resin impregnation bath 2, and by means of the electric heating coil 8, the resin solution is heated continually so as to supplement the loss of heat. Preferably, a temperature sensor is arranged at a bottom of an inner wall of the resin impregnation bath 2 and just located below the resin dipping roller 6. The temperature sensor is able to detect the temperature of the resin solution in real time, and transmit a detection result to the controller. And the detection result is compared with a preset temperature, thereby adjusting heating power of the electric heating coil 8 according to positive and negative temperature differences, and ensuring the stability of the heating process and a temperature environment of the resin solution. As required, a temperature display may also be provided on an outer wall of the resin impregnation bath 2, for displaying temperature detected by the temperature sensor, such that workers may view real-time temperature of the resin solution conveniently.

Further, a thermal isolation layer 16 is provided on the inner wall of the resin impregnation bath 2, so as to lower the heat dissipation rate inside the resin impregnation bath 2 and reduce energy loss.

In order to compensate the heat energy loss of the resin solution with increasing resin solution and ensure the stability of the temperature of the resin solution at the impregnation position, an electric heating rod 9 is provided at an axis of the pressure roller 7. The electric heating rod 9 uniformly heats the outer periphery surface of the pressure roller 7, and then the pressure roller conducts auxiliary heating on the resin solution at the impregnation position, thereby greatly improving the quality of fiber impregnation.

Figure 5:
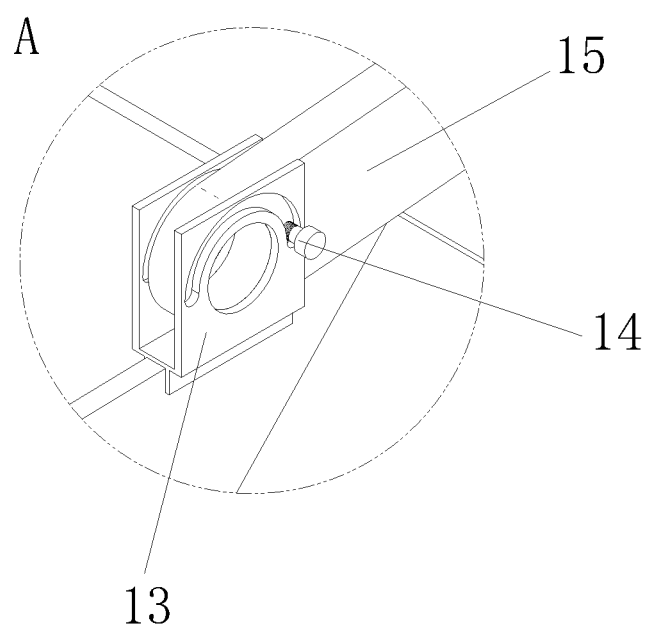
FIG. 5 is an enlarged schematic diagram of part A in FIG. 1.

Two wire guide rollers 10 are rotatably mounted at two ends of the side wall of the resin impregnation bath 2 and located at two sides of the resin dipping roller 6 respectively. A plurality of connection seats 13 are fixedly connected to tops of side walls of two sides of the resin impregnation bath 2. As shown in FIG. 5, a support plate 15 is rotatably connected to each connection seat 13 via a lock screw 14, and the pressure roller 7 and the wire guide roller 10 are rotatably mounted at ends of the respective support plates 15. A bottom of each connection seat 13 is inserted and clamped at a top end of the side wall of the resin impregnation bath 2, a side surface thereof is provided with an arc-shaped through groove. A bottom end of a side surface of the support plate 5 is provided with a threaded hole, the lock screw 14 passes through the arc-shaped through groove to be threadedly connected with the threaded hole, and thus, an inclination angle of the corresponding support plate 15 may be adjusted by loosening the lock screw 14, thereby adjusting working positions of the pressure roller 7 and the wire guide roller 10. A position of the support plate 15 after adjustment may be fixed by screwing the lock screw 14. By adjusting a working position of the pressure roller 7, the gap between the pressure roller 7 and the resin dipping roller 6 may be adjusted, thereby controlling the resin content inside the fiber bundle. By adjusting working positions of the two wire guide rollers 10, an angle of the fibers upon impregnation may be controlled, thereby meeting different technological requirements.

What is described above is only an embodiment of the present disclosure and does not limit the protection scope of the present disclosure, and equivalent structure or equivalent process change made by using contents of the specification and the drawings in the present disclosure and used directly or indirectly in other related technical fields shall all fall within the scope of protection of the present disclosure in a similar way.

What is claimed is:

1. A resin bath device for wet winding, comprising a resin stirring bath (1) and a resin impregnation bath (2) which are adjacent to each other, wherein a bottom of a side wall of the resin stirring bath (1) is connected to the resin impregnation bath (2), a first ingredient bath (3) and a second ingredient bath (4) are fixedly provided at two ends of the resin stirring bath (2) respectively, a bottom of the first ingredient bath (3) and a bottom of the second ingredient bath (4) are connected to an interior of the resin stirring bath (1), and a stirring mechanism (5) is provided inside the resin stirring bath (1) and located between the first ingredient bath (3) and the second ingredient bath (4);

a resin dipping roller (6) is rotatably mounted at a middle of the resin impregnation bath (2), a pressure roller (7) is rotatably mounted at tops of two side walls of the resin impregnation bath (2) and located above the resin dipping roller (6), an electric heating coil (8) is arranged inside a bottom wall of the resin impregnation bath (2), and an electric heating rod (9) is provided at an axis of the pressure roller (7); and wire guide rollers (10) are rotatably mounted at two ends of the side walls of the resin impregnation bath (2) and located on two sides of the resin dipping roller (6) respectively.

2. The resin bath device for wet winding according to claim 1, wherein a resin outlet (101) connected to the resin impregnation bath (2) is provided at the bottom of the side wall of the resin stirring bath (1), and a switching mechanism (11) for the resin outlet (101) is provided at a top of the side wall of the resin stirring bath (1).

3. The resin bath device for wet winding according to claim 2, wherein the switching mechanism (11) comprises a cylinder mounting frame (111) fixedly connected to the side wall of the resin stirring bath (1), a cylinder (112) fixedly mounted at a top of the cylinder mounting frame (111) and a switching baffle plate (113) fixedly connected to an output shaft end of the cylinder (112), a side surface of the switching baffle plate (113) is slidably attached to an inner wall of the resin stirring bath (1) and movably covers the resin outlet (101).

4. The resin bath device for wet winding according to claim 1, wherein feeding ports (301) are provided on bottom walls of the first ingredient bath (3) and the second ingredient bath (4) respectively, proportion adjustment plates (12) for the feeding ports (301) are movably inserted into the side wall of the resin stirring bath (1), and top surfaces of the proportion adjustment plates (12) are slidably attached to bottom surfaces of the first ingredient bath (3) and the second ingredient bath (4) respectively.

5. The resin bath device for wet winding according to claim 1, wherein an outer periphery surface of the resin dipping roller (6) is of a saddle surface structure, and an outer periphery surface of the pressure roller (7) is of a waist drum-shaped structure matching the outer periphery surface of the resin dipping roller (6).

6. The resin bath device for wet winding according to claim 1, wherein reticulated protrusions are arranged on the outer periphery surface of the resin dipping roller (6).

7. The resin bath device for wet winding according to claim 1, wherein a plurality of connection seats (13) are fixedly connected to the tops of the side walls of the resin impregnation bath (2), a support plate (15) is rotatably connected to each of the connection seats (13) via a lock screw (14), and the pressure roller (7) and the wire guide roller (10) each are rotatably mounted at an end of respective support plate (15).

8. The resin bath device for wet winding according to claim 1, wherein a temperature sensor is provided at a bottom of an inner wall of the resin impregnation bath (2) on which the resin outlet is arranged and just located below the resin dipping roller (6).

9. The resin bath device for wet winding according to claim 1, wherein a thermal isolation layer (16) is provided on the inner wall of the resin impregnation bath (2).

10. The resin bath device for wet winding according to claim 5, wherein reticulated protrusions are arranged on the outer periphery surface of the resin dipping roller (6).

* * * * *